INVENTORS
CARL A. FRISCHE
ORLAND E. ESVAL
BY
Herbert H. Thompson
their ATTORNEY.

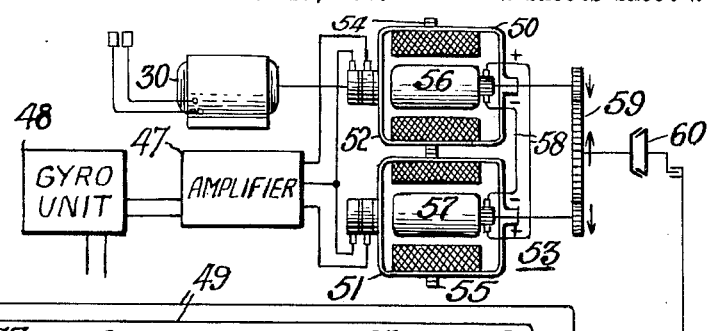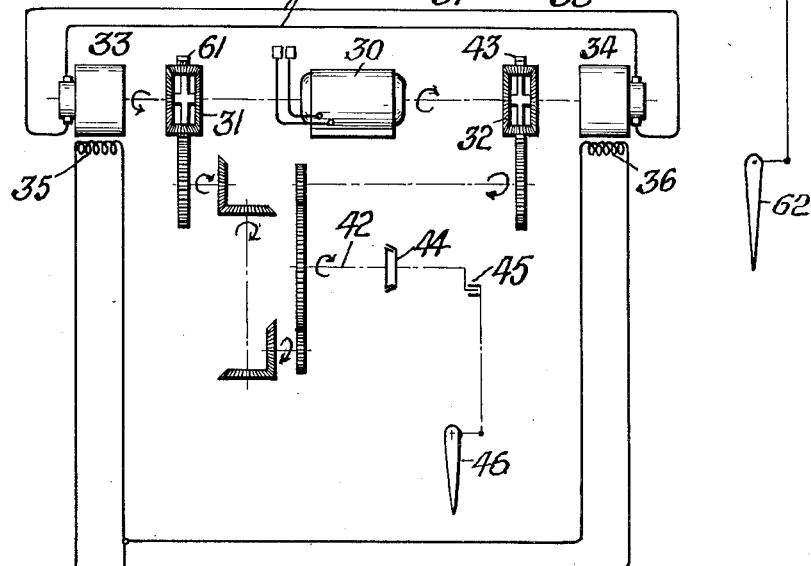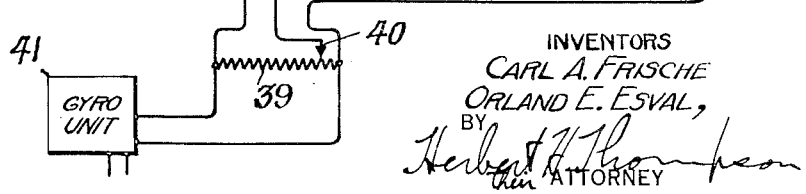

Patented May 9, 1944

2,348,211

UNITED STATES PATENT OFFICE 2,348,211

SERVO MECHANISM

Carl A. Frische, Leonia, and Orland E. Esval, Allendale, N. J., assignors to Sperry Gyroscope Company, Inc., Brooklyn, N. Y., a corporation of New York Application October 19, 1940, Serial No. 361,860

3 Claims. (Cl. 74—293)

This invention relates, generally, to servo mechanisms wherein a controlling member or object is employed which is usually capable of exerting but a small control force that is greatly amplified before being applied to operating a controlled object or member, and the invention has reference, more particularly, to a novel improved servo mechanism employing either electrical or hydraulic means for effecting the desired operation.

In copending applications Serial No. 259,178, of George P. Bentley and Carl A. Frische, for Hydraulic control system, filed March 1, 1939, and Serial No. 284,642, of Carl A. Frische, George P. Bentley and Percy Halpert, for Electro-hydraulic control system, filed July 15, 1939, there are disclosed hydraulic servo means controlled either electrically or mechanically, whereby a delicate instrument, such as a gyroscope, may be used for controlling objects requiring considerable force for their actuation, such as the control surfaces of aircraft. The present invention is also suitable for this use and other uses where delicate instruments or other small power apparatus are used for controlling large forces applicable to ponderable or other objects requiring the application of considerable force in their operation.

The principal object of the present invention is to provide a highly efficient servo mechanism that is positive in its operation and dead beat in action, the said mechanism responding quickly and without hunting to the application of a control force or movement.

Another object of the present invention lies in the provision of a novel servo mechanism employing means for controlling motive means acting through power transmission means for effecting the drive of the controlled member.

A further object of the invention is to provide continuously operating motive means acting through power transmission means, including oppositely driven members for driving the controlled object, said oppositely driven members being controlled in their action by the controlling member.

A still further object of the present invention is to provide a hydraulic control system which operates at low pressure when the controlled object is not being moved so that the system can be economically operated by low power means.

A still further object of the present invention is to provide an electric control system which normally floats when the controlled object is not being moved, thereby greatly reducing power consumption and increasing the overall efficiency of the system.

Other objects and advantages will become apparent from the specification, taken in connection with the accompanying drawings wherein the invention is embodied in concrete form.

In the drawings,

Fig. 1 is a schematic view, partly in section, of one form of the servo mechanism of this invention employing motive means operating through differentials and fluid pumps for actuating the controlled object.

Fig. 1—A is an enlarged fragmentary view of a portion of the control valve employed in Fig. 1.

Fig. 3 is a diagrammatic view of a servo mechanism employing motive means operating through differentials and electrical braking means for controlling the driven object.

Fig. 4 is a schematic, partial sectional view of a modification of the structure of Fig. 3, and Fig. 5 is a schematic view of another modification.

Similar characters of reference are used in all of the above figures to indicate corresponding parts.

Figures 1, 1A, 2:
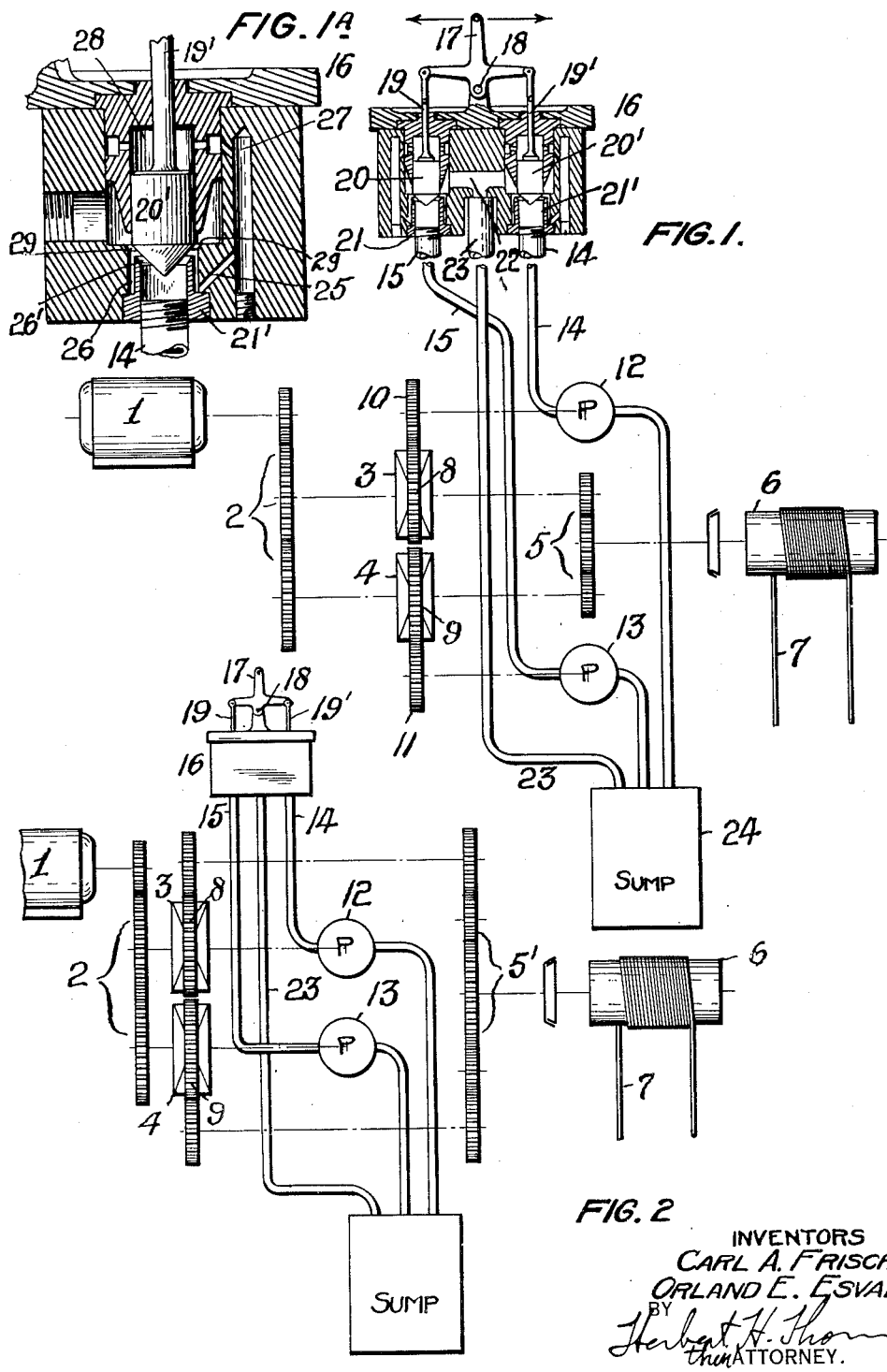
Fig. 2 is a schematic view of a modification of the structure shown in Fig. 1.

Referring now to Figs. 1 and 1—A of the drawings, the reference numeral 1 designates a driving motor or motive means, illustrated as an electric motor which operates through power transmission means including gearing 2 to continuously drive corresponding sides of two differentials 3 and 4 in opposite directions and preferably at the same speed. The other sides of the differentials 3 and 4 are connected through gearing 5 to drive a drum 6 connected, as by cable 7, to the driven object, which may be the control surface of an airplane, for example, although any suitable object may be so driven.

The spider gears 8 and 9 of differentials 3 and 4 are connected through gears 10 and 11 to drive fluid pumps 12 and 13. The two pumps 12 and 13, if desired, may be combined into a single unitary structure, these pumps being shown as separate structures in the drawings in order to simplify the latter. The outputs of pumps 12 and 13 are connected through pipes 14 and 15 to a master control valve 16 shown as having a small power operating lever or controlling member 17 pivoted at 18 and actuating plungers 19 and 19' connected to piston valves 20 and 20'. Valves 20 and 20' cooperate with the upper beveled ends 26' of nipples 21 and 21' into which pipes 15 and 14 are respectively threaded. Valves 20 and 20' never actually close down upon nipples or sets 21 and 21', so that there is a continuous flow of fluid from pipes 14 and 15 through these nipples, past valves 20 and 20', through valve passage 22 into sump pipe 23 connected with sump 24. Piston valves 20 and 20' may be substantially balanced, the fluid pressure for effecting balancing being applied to the upper surfaces of these valves through ducts 25 (see Fig. 1—A) communicating with annular spaces 26 surrounding nipples 21 and 21'. Ducts 25 communicate with ducts 27 which, in turn, communicate with the spaces 28 overlying the pistons 20 and 20'.

It will be noted that not only are the upper ends of nipples 21 and 21' beveled at 26' to accommodate the piston valves, but that also the surrounding valve casing wall is beveled at 29, as best shown in Fig. 1—A, so that the annular beveled surface 29 also serves, in effect, as a continuation of the bevel 26' of nipple 21 or 21', as the case may be. The lower ends of the piston valves are also beveled but at a somewhat different angle from the bevel of nipples 21 and 21' and bevels 29. Thus, if the upper ends of nipples 21 and 21' are beveled at an angle of 30° with respect to the piston axis, i. e., subtend an angle of 60°, which is also true of the bevels 29, then the lower ends of the pistons 20 and 20' could be beveled at an angle of 45°. This has the effect of locating the inlet for duct 25 at a point intermediate the entrance of fluid to valves 20 and 20' and the exit of fluid therefrom, the exact positioning of the annular spaces 26 in this intermediate region serving to determine the back pressure to be exerted on the top of valves 20 and 20' through chambers 28. Due to the tapering annular orifice between the end of valve piston 20 and its seat 26', 29, the velocity of flow will be greatest at the periphery of the valve piston head and the least at the center. By the Bernouilli principle of hydrodynamics, this results in a decreased pressure at the periphery of the valve so that the average pressure on the valve piston head is lower than the pressure in passage 14. If the bypass 25 where to transmit the pressure of the passage 14 to the rear of the piston, the valve would therefore be drawn closed. However, a pressure gradient exists through the annular orifice and the duct 25 is tapped off at a point suitable for obtaining proper pressure in passage 28 to substantially balance the pressure applied to the face of the valve. The back pressure applied at passage 28 will always be less than or, at most, equal to the average pressure on the piston head despite the various conditions of flow, and will therefore provide satisfactory balancing action at all times. Thus, a nice control of the pressure on top of valves 20 and 20' is obtained, enabling the operation of these valves with the application of but slight force to lever 17 and the automatic return, if desired, of these valves to their self-centered or neutral position shown in the figures when the control force is removed from lever 17. Irregular motion and locking of the valve due to the Bernouilli effect, which is present in many of the older systems, is thus prevented.

In operation, motor 1, acting through gearing 2, serves to rotate spider gears 8 and 9 in opposite directions to thereby drive pumps 12 and 13, the drum 6 being stationary and the control lever or member 17 being in its neutral position, as shown. These pumps serve to pump fluid, such as oil, from sump 24 through pipes 14 and 15, around valves 20 and 20', and back into sump return pipe 23. Inasmuch as valves 20 and 20' are both open, there is a free flow of fluid so that but negligible energy is required of motor 1 to operate pumps 12 and 13. When it is desired to drive the object actuated by cable 7, the control lever 17 is moved in one direction or the other, depending upon the direction in which it is desired to actuate the controlled member. Thus, if lever 17 is actuated to the right, as shown in Fig. 1, then valve 20' is moved toward the cooperating beveled surfaces 26' and 29 so that the flow of oil past the valve 20' is restricted, thereby putting a load upon pump 12 while pump 13 continues to run as normally. An increasing load upon pump 12 serves to progressively slow up and finally stop the rotation of spider gear 8 so that motor 1 drives directly through the differential 3 and gearing 5 to operate the drum 6 in one direction.

If the control handle 17 is moved to the left, the valve 20 moves toward cooperating beveled surfaces 26' and 29 and loads pump 13, pump 12 idling in the meantime. The lead upon pump 13 causes motor 1 to drive through gearing 2, directly through differential 4 and gearing 5 to drive drum 6 in the reverse direction to that obtaining when pump 12 was loaded. Thus, it will be seen that merely flipping control lever 17 in one direction or the other will serve to immediately effect reversal of the drive of drum 6 through the direct gearing or power transmission means shown.

Inasmuch as both pumps are idling when the valve rod 17 is in neutral position, the system is extremely efficient in operation. Also, since the back pressure on the upper surfaces of valves 20 and 20' is determined at will by the back-pressure pick-off through proper location of annular grooves 26, the operation of lever 17 may be made as delicate as desired.

The structure of Fig. 2 is very similar to that of Fig. 1 with the exception that the pumps 12 and 13 are driven from the opposite side of the differential rather than from the spider gear thereof, while the gearing 5', driving drum 6, is driven from the spider gears 8 and 9 of differentials 3 and 4. Otherwise the structure of Fig. 2 is similar to that of Fig. 1.

In the form of the invention shown in Fig. 3, motive means 30, illustrated as an electric motor, is connected through power transmission means for driving controlled member 46. Motor 30 is connected for driving the sides of differentials 31 and 32, the other sides of these differentials being respectively connected for driving dynamos 33 and 34. These dynamos are shown as of the shunt type, having shunt field windings 35 and 36, and are connected to loads 37 and 38. The fields 35 and 36 of dynamos 33 and 34 may be controlled as by a potentiometer 39, so that as the tap or controlling object 40 of this potentiometer is moved, the strength of one field is increased while that of the other is decreased, and vice versa, depending on the direction in which the tap 40 is moved. A similar control may be provided by a gyro unit 41, if desired. The spider gear 61 of differential 31 is connected through suitable gearing shown for driving the driven shaft 42 in one direction when dynamo 33 is loaded, whereas the spider 43 of differential 32 is connected through suitable gearing for driving the driven shaft 42 in the reverse direction when dynamo 34 is loaded. Driven shaft 42 is shown connected through a clutch 44 and crank 45 to the control surface 46.

In operation, assuming that tap 40 is in the position shown in Fig. 3, then a higher voltage will be supplied to field winding 35 than is supplied to field winding 36, so that the output of dynamo 33 acting as a generator exceeds that of dynamo 34, resulting in the braking of differential 61 much more than the braking of the differential 43 and causing spider gear 61 to drive shaft 42 and control surface 46 in one direction. Moving the tap 40 so as to increase the current through winding 36 while decreasing that through 35 will effect the reverse drive of control surface 46. When tap 40 is located centrally of potentiometer 39, the system is stationary.

In the form of the invention shown in Fig. 5, the efficiency over that in Fig. 3 is increased by virtue of the fact that the external loads 37 and 38 are eliminated and one dynamo, 33 for example, is caused to act as a motor while the other dynamo 34 is acting as a generator. In this figure, the gyro unit 48 serves as the controlling member, the output of which is amplified by a push-pull amplifier 47 of the type disclosed in application Ser. No. 284,642 above referred. Amplifier 47 is connected for differentially controlling the fields 35 and 36 of dynamos 33 and 34. Thus, assuming that the field 36 is strengthened, causing dynamo 34 to operate as a generator and loading one side of differential 32, then member 34 will act as a generator and will supply current through leads 49 to drive dynamo 33 as a motor. Dynamo 34 loads the differential 32 so that its spider gear 43 drives the control surface 46 through the transmission illustrated. Dynamo 33, operating as a motor, drives through differential spider 61 and the gearing shown to drive the control surface 46 in a direction to aid the drive of this control surface from motor 30 through differential 32 and the gearing shown. Thus, assuming motor 30 is rotated in the direction shown by the arrow, the drive of shaft 42 may be traced through the arrows shown. Conversely, when the field 35 is strengthened and the field 36 weakened, the dynamo 33 will act as a generator, causing motor 30 to drive through differential 31 and effect the reverse drive of shaft 42, which action is aided by dynamo 34 acting as a motor and operating through differential 32 and the gearing shown.

In the form of the invention shown in Fig. 4, the continuously operating motor 30 is shown connected through power transmission means for driving the control surface 62. This transmission means includes the field structures 50 and 51 of dynamos 52 and 53 that are driven in opposite directions by motor 30. Note these field structures are interconnected by gears 54 and 55 to rotate in opposite directions. The armature structures 56 and 57 of these dynamos, wound as D. C. generator armatures, are interconnected by leads 58 in series opposing and act through gearing 59 and clutch 60 to drive the control surface 62.

In operation, with no signal supplied from gyro unit 48 to amplifier 47, the current in fields 50 and 51 is equal so that consequently the voltages induced in the armatures 56 and 57 are equal and with the armatures connected with their voltages opposing, there is no current in these armatures so that they develop no torque. Assuming that a signal from the gyro unit varies the amplifier output so that the field winding of dynamo 52 is energized more than that of dynamo 53, as in the manner of Fig. 5, then 52 will act as a generator supplying energy to armature 51, causing the dynamo to act as a motor, so that both dynamos drive the member 62 in one direction. This will be apparent when it is noted that since power is being taken from generator 52, its armature will rotate in such a direction as to decrease the relative speed between armature and field, whereas since power flows into the armature of dynamo 53, its armature will rotate in such direction as to increase the relative speed between the armature and field. Since the field structures are geared together to rotate in opposite directions, the armatures must rotate in the same direction as shown by the arrows. When the field winding of dynamo 53 is excited more than that of 52, 53 acts as a generator and cooperates with 52 acting as a motor to drive the control surface in the reverse direction.

This system provides an accurate and smooth speed and torque control, from zero speed to driven motor speed and from zero torque to drive-motor torque. The efficiency of the system at all speeds and torques is high since the system is regenerative.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. A servo mechanism for operating a loaded controlled object from a sensitive controlling object, comprising continuously operating motive means, transmission means connecting said motive means with said controlled object, said transmission means comprising oppositely and continuously driven differentials, one arm of each of which is connected to drive the controlled object one in one direction and one in the reverse direction, a free circulating fluid pump driven from a second arm of each of said differentials, a normally open throttle valve in the circulating line from each pump, each of said throttling valves comprising a cylinder, a piston valve therein, a back portion and a conical seat throttling portion, means for introducing fluid adjacent said throttling portion, and a pressure equalizing passage connected adjacent said conical throttling portion to the back portion of said valve for balancing purposes, and means moved from said controlling object for gradually differentially closing one or the other of said valves to thereby increase the load exerted by the selected pump upon its differential, whereby the controlled object is driven at a desired variable speed in either direction dependent on the movement of the controlling object.

2. In a servo mechanism for operating a loaded controlled object from a sensitive controlling object and having continuously operative motive means oppositely driving a pair of differentials connected to drive the controlled object in opposite directions, the improvement in apparatus for differentially loading the differentials comprising a first fluid pump driven by one of the differentials and including a circulating line, a second fluid pump driven by the other of the differentials and including a separate circulating line, a differentially movable pair of self-centering valves, one of which is located in the circulating line of the first pump and the other of which is located in the circulating line of the second pump, and means for moving said valves responsive to the controlling object to increase the load on one of the pump-driving differentials and decrease the load on the other of the differentials to thereby control the direction of movement of the driven object.

3. A servo mechanism for operating a loaded controlled object from a sensitive controlling object comprising continuously operative motive means, transmission means connecting said motive means with said controlled object, said transmission means including oppositely and continuously driven differentials, one arm of each of which is connected to drive the controlled object one in one direction and one in the reverse direction, a first fluid pump driven by a second arm of one of the differentials and including a circulating line, a second fluid pump driven by a corresponding arm of the other of the differentials and including a separate circulating line, a separate balanced valve in each of the circulating lines, a self-centering pivotal connection for said valves, and means for differentially moving said valves through said connection and responsive to the controlling object to vary the load on the differentials and thereby control the direction of movement of the driven object.

CARL A. FRISCHE.
ORLAND E. ESVAL.